Jan. 6, 1970  W. R. HOOPES  3,488,096
INVOLUNTARY HYDRAULIC SAFETY BRAKING SYSTEM
Filed Oct. 30, 1967  2 Sheets-Sheet 1
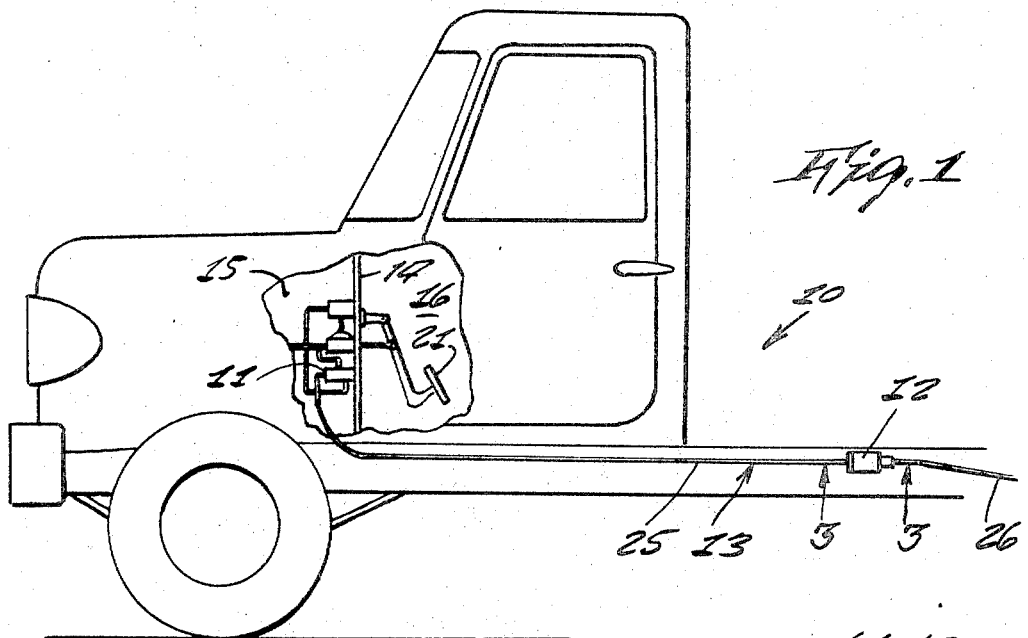
Fig. 1
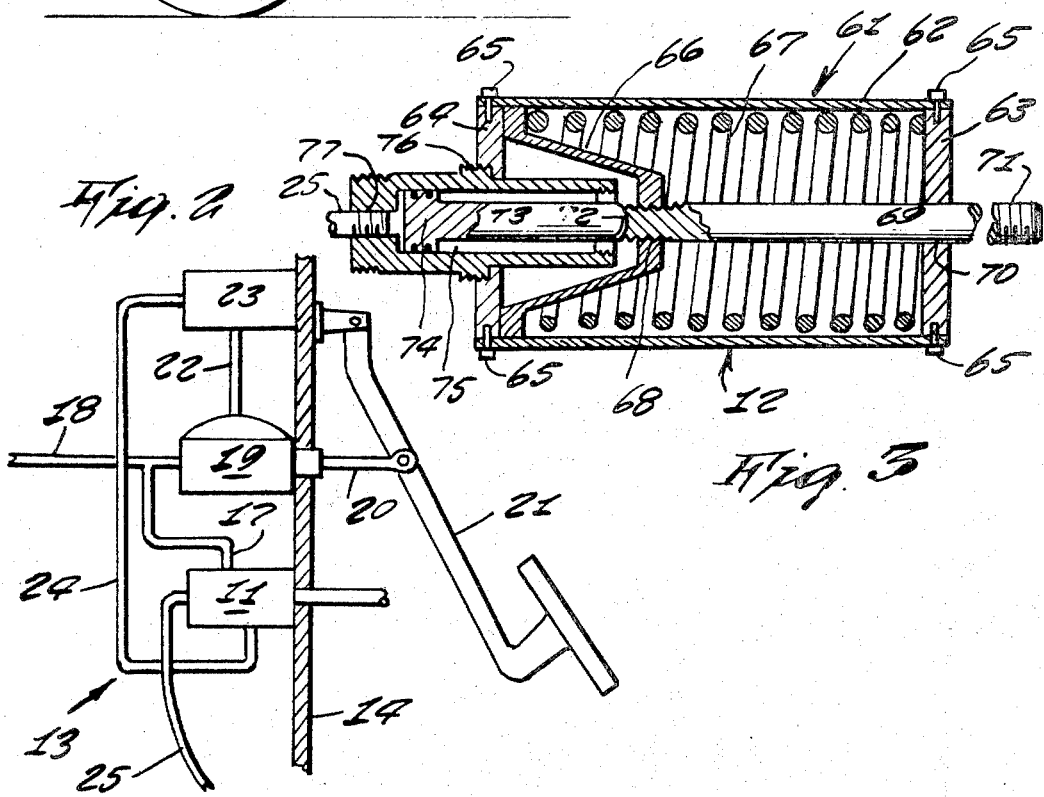
Fig. 2
Fig. 3
INVENTOR
WILLIAM R. HOOPES

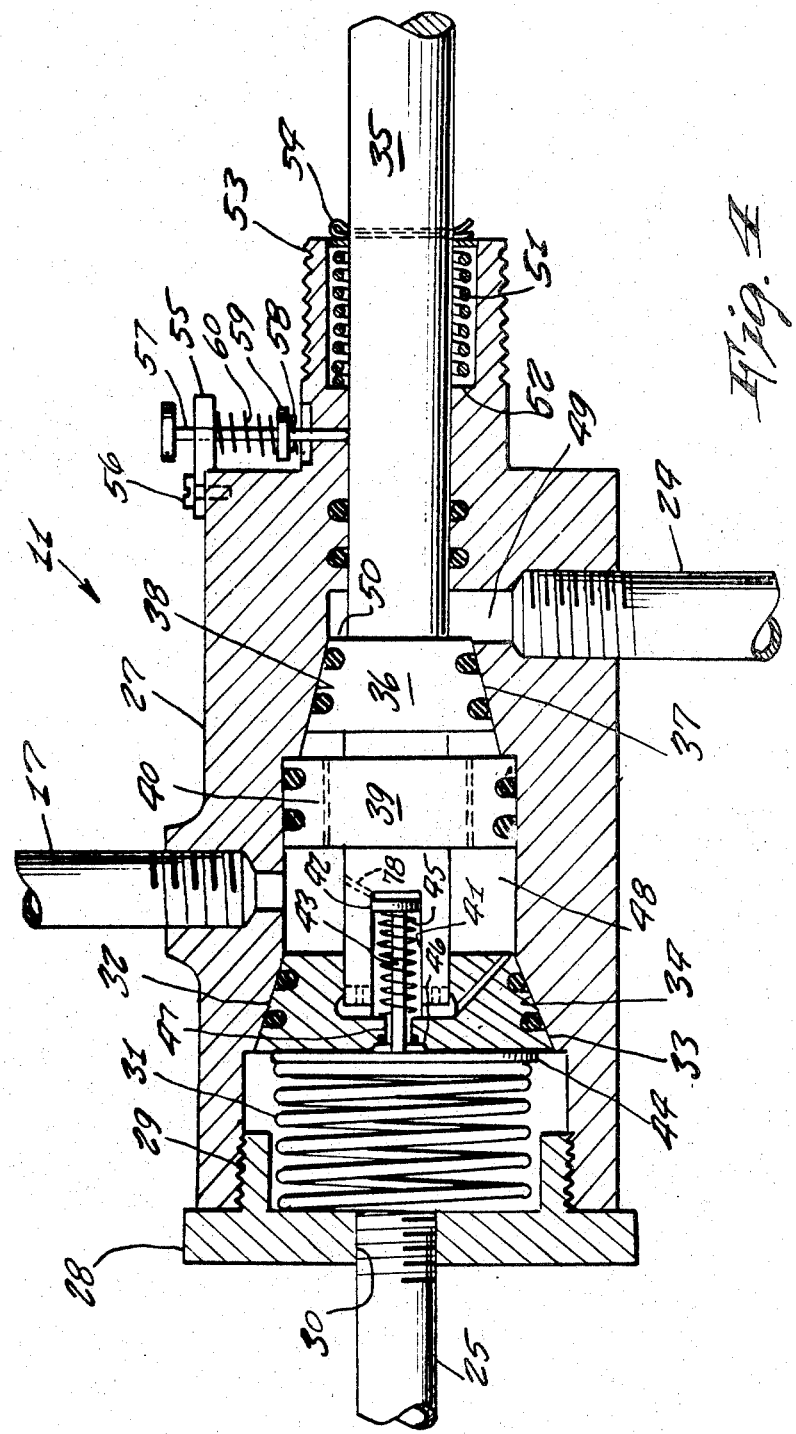

United States Patent Office 3,488,096
Patented Jan. 6, 1970

3,488,096
INVOLUNTARY HYDRAULIC SAFETY
BRAKING SYSTEM
William R. Hoopes, Oroville, Calif.
(Box 62, Pollock Pines, Calif. 95726)
Filed Oct. 30, 1967, Ser. No. 678,874
Int. Cl. B60t 7/12, 17/18
U.S. Cl. 303—9      3 Claims

ABSTRACT OF THE DISCLOSURE

An automatic brake system for stopping an automotive vehicle such as a truck equipped with hydraulic or hydrovac brakes which have failed to operate due to loss of fluid or improperly adjusted brake shoes, the brake system including an involuntary emergency check and release valve unit which is connected to a brake activating cylinder.

---

This invention relates generally to automotive truck emergency braking systems.

A principal object of the present invention is to provide an involuntary hydraulic safety braking system for an automotive truck equipped with hydraulic or hydrovac brakes that have failed to operate due to loss of fluid or improperly adjusted brake shoes, the involuntary hydraulic safety braking system having self-contained means for stopping the vehicle and holding it in a braked position.

Another object of the present invention is to provide an involuntary hydraulic safety braking system which will automatically apply brakes when the service brakes pedal is pushed beyond a set limit.

Yet another object of the present invention is to provide an involuntary hydraulic safety braking system that is comprised of two major units and several feet of high pressure hose and tubing.

Other objects of the present invention are to provide an involuntary hydraulic safety braking system which is simple in design, inexpensive to manufacture, rugged in construction, easy to use and efficient in operation.

These and other objects will be readily evident upon a study of the following specification and the accompanying drawing wherein:

FIGURE 1 is a fragmentary side elevation view of an automotive truck shown partly in cross section and shown incorporating the present invention;

FIGURE 2 is an enlarged fragmentary side elevation view of the structure shown in FIGURE 1 taken in the same plane;

FIGURE 3 is an enlarged cross-sectional view taken on the line 3—3 of FIGURE 1; and FIGURE 4 is an enlarged cross-sectional view of the involuntary emergency check and release valve taken in the same plan as is illustrated in FIGURE 2 of the drawing.

Referring now to the drawing in detail, the reference numeral 10 represents an involuntary hydraulic safety braking system, according to the present invention, wherein there are two major units which comprise an emergency check and release valve 11 and a brake activatng cylinder 12 which are interconnected together and with associate parts by means of high pressure hose or tubing 13.

As is shown in FIGURE 1 of the drawing, the involuntary emergency check and release valve 11 is mounted upon a fire wall 14 which divides the engine compartment 15 from the cab 16. As is shown in FIGURES 1 and 2 of the drawing, an inlet tubing 17 to the involuntary emergency check and release valve is connected to a brake-line tube 18 that is connected at one end to a master cylinder 19, the master cylinder 19 being activated by means of an arm 20 pivotally connected to a brake pedal 21 that is manually operated by a driver of the vehicle. A tube 22 communicates between the master cylinder 19 and a reserve cylinder 23, the reserve cylinder 23 being communicated by means of a tube 24 to an outlet side of the involuntary emergency check and release valve 11. A hose or tube 25 is connected at one end to the involuntary emergency check and release valve, the opposite end of the tube 25 being connected to one end of the brake activating cylinder 12. The opposite end of the brake activating cylinder is connected by a cable 26 to the brakes upon the vehicle wheels.

As is shown in FIGURE 4 of the drawing, the involuntary emergency check and release valve 11 is shown comprising a case 27 having an end cap 28 secured to one end thereof by means of threads 29, the end cap 28 having a central opening 30 that is threaded so to engage one end of the tubing 25. Adjacent the end cap 28 there is a compression coil spring 31 which bears at one end against the end cap, the opposite end of the spring 31 bearing against one side of a check valve 32 having tapering side wall 33 that engages a correspondingly tapered wall 34 of the case 27. The involuntary emergency check and release valve further includes a longitudinally extending shaft 35 which enters the case 27 from the end opposite the end cap 28, the shaft 35 carrying a check 36 having a conically configurated side wall 37 that bears against a correspondngly conically configurated wall 38 of the case 27 the shaft 35 further carrying a cylindrically configurated check 39 having a plurality of openings 40 extending therethrough, the shaft end within the case having a central opening 41 for receiving therein a piston head 42 at one end of a shaft 43 which is connected at its opposite end to a plate 44 between the compression coil spring 31 and an end wall of the check valve 32. A compression coil spring 45 bears at one end against the piston head 42 and at its opposite end against a side of the check valve 32. A check valve 46 is formed at one end of an opening 47 extending centrally through the check valve 32, the opening 47 communicating with the opening 41 in the shaft 35. An opening 48 is formed normally between the check 39 and the check valve 32 which is normally in communication with the inlet tubing 17 that is connected at its opposite end to the brake line tubing 18 from the master cylinder 19. A space or chamber 49 is formed adjacent the rear side 50 of the check 36, the chamber 49 communicating normally with the outlet tubing 24 that communicates at its opposite end to the reserve cylinder 23. A compression coil spring 51 normally urges the shaft 35 rearward, one end of the compression coil spring bearing against a rear wall 52 of the case 27, the opposite end of the spring 51 bearing against a cap 53 which rests against a cotter pin 54 extending transversely through the shaft 35.

A holder 55 secured by screws 56 to the case 27 support a lock key 57 having one end in abutment with a side of the shaft 35, the lock key having a cotter pin 58 against which there rests a cap 59, the cap 59 having one end of a compression coil spring bearing against the same, the opposite end of the compression coil spring 60 bearing against the holder, the spring 60 thus normally urging the lock key against the side of the shaft 35. The elements 55 to 60 function to lock the shaft against movement.

The brake activating cylinder 12 includes a cylindrically configurated case 61 comprised of cylindrical side walls 62 and opposite end walls 63 and 64 which are secured to the side wall by means of screws 65. A conically configurated carrier 66 within the cylinder bears against one end of a compression coil spring 67, the opposite end of the compression coil spring 67 bearing against an end wall 63. A threaded central opening 68 within the carrier is threadingly engaged with a shaft 69 extending through opening 70 in the end wall 63, the terminal end of the shaft 69 being threaded as is shown at 71. The opposite end of the shaft 69 is concave as shown at 72 so to receive a rounded end of a piston rod 73 having a piston head 74 that is slideable within a cylinder 75. The cylinder 75 is secured by means of threads 76 within a threaded opening centrally located within the end wall 64 of the brake activating cylinder 12. A threaded opening 77 in one end of the cylinder 75 is provided for threadingly engaging one end of the hose or tubing 25.

An is shown in FIGURES 3 and 4 the cylinder head 74 is provided with a plurality of O-rings so as to provide a tight seal, and the checks and check valves as well as the shaft of the emergency check and release valve unit are likewise provided with O-rings for the same purpose.

In operative use, the involuntary emergency check and release valve operates as follows:

To release the brake activating cylinder 12 from its applied position, the brake pedal 21 is first depressed. This causes pressure to be transmitted from master cylinder 19 through tubing 17 to the opening 48. Pressure acting on piston head 42 via passage 78 causes the check valve 46 to open and transmit pressure to tube 25, causing the brakes to be released.

The shaft 35 and checks 36 and 39 do not operate except to act as a plug and when releasing fluid from the system. Most of the work is done by check valves 32 and 46 which hold the pressure within the system and keep the activating spring 67 of the brake activating cylinder in a compressed position. When the shaft 35 is pushed inward, it opens the check 36 and closes the master cylinder inlet opening by means of check 39. As it continues forward, the shaft 35 comes in contact with check valve 46 which is the initial pressure release causing it to open. With check valve 46 open, the largest check valve 32 is opened to release all the pressure left in the system. The fluid is now free to move through the complete unit, to the excess container. This operation lets fluid from the brake activating cylinder to pass through the valves 32 and 46 as well as valve 39 by means of openings 40 extending through check valve 39. Thus the fluid passes between check valve 39 and 36 and through a high pressure tube 24 to the excess container or reserve cylinder 23.

The pressure from the involuntary emergency check and release valve unit 11 causes the piston 73 to depress. When this action is made, the spring 67 is compressed and remains compressed until released by the involuntary emergency check and release valve. When the pressure is released, the piston 73 is driven forward by the spring at the same time, applying the brakes.

It is to be understood that the mounting of the various components of the present invention need not be limited to the specific construction illustrated in the drawing. For example, the release valve 11 may be mounted elsewhere in the vehicle and be tripped or released by an electric solonoid or by a vacuum cylinder, or it may be offset and use a lever with an over center spring. Likewise the brake activating cylinder 12 may be mounted on the rear axle or brake mounting plate, or both units may be mounted on the rear axle along with the necessary remote control parts. Any other mounting variation is also readily covered by the present invention.

I claim:

1. In an involuntary hydraulic safety braking system, the combination of an involuntary emergency check and release valve, a brake activating cylinder, and a single tubing between said emergency check and release valve and said brake activating cylinder, said check and release valve communicating with a brake line tubing of a master cylinder activated by a brake pedal of an automotive vehicle and said master cylinder further communicating with a reserve cylinder, said brake activating cylinder comprising a cylindrical case having a cylindrical side wall between a pair of circular end walls, a shaft extending through one of said end walls, said shaft being theaded at one end for securement to cables connected at the opposite ends to the brakes of the vehicle wheel, the opposite end of said shaft being threadingly engaged to a conically configurated carrier slidable within said cylinder, a compression coil spring within said cylinder bearing at one end against said carrier and at its opposite end against said end wall having said shaft extending therethrough, the opposite of said end walls having a central, threaded opening which is threadingly engaged with a cylinder carrying a slidable piston therewithin, said piston having a rod which bears at one end against said threaded end of said shaft, said piston having a piston head slidable within said cylinder and said cylinder having an opening in one end for receiving one end of a tubing which communicates at its opposite end to an outlet opening of said emergency check and release valve.

2. The combination as set forth in claim 1 wherein said involuntary emergency check and release valve comprises a case having a threadingly secured end cap at one end thereof, said end cap having said outlet opening therethrough, a first compression coil spring bearing at one end against said end cap, the opposite end of said compression coil spring bearing against one side of a conically configurated check valve having one end of a central shaft slideable thereinto, said shaft extending outwardly through the opposite end of said case, said shaft having a second conically configurated check valve and a cylindrical configurated check valve secured thereupon, a compression coil spring between a rear wall of said case and a transverse extending cotter pin through said shaft for normally urging said shaft rearwardly, said brake lining tubing of said master cylinder normally communicating with a chamber within said case located between said cylindrical check valve and said first conical configurated valve, a second chamber within said case located at the rear of said second conically configurated check valve, said chamber communicating with an outlet port connected by a tubing to said reserve cylinder and said shaft having an opening in one end thereof for receiving a slideable piston head secured at one end of a shaft secured to a plate adjacent said first conically configurated check valve, and said plate forming a check valve for a central opening extending through said first conically configured check valve.

3. The combination as set forth in claim 2 wherein said involuntary emergency check and release valve further includes a holder supporting a lock key, one end of said lock key bearing against a side of said shaft of said emergency check and release valve, a compression coil spring bearing against one end of said holder and at its opposite end against a cap secured by a cotter pin upon said lock key to normally urge said lock key against said shaft.

References Cited
UNITED STATES PATENTS

| | | | |
|---|---|---|---|
| 2,065,259 | 12/1936 | Ball et al. | |
| 2,085,040 | 6/1937 | Post | 188—170 |
| 3,114,580 | 12/1963 | Mac Duff | 303—9 XR |
| 3,114,581 | 12/1963 | Tuszynski | 303—2 |
| 3,276,551 | 10/1966 | Bulett et al. | 188—108 XR |

FOREIGN PATENTS 736,937  9/1955  Great Britain.

MILTON BUCHLER, Primary Examiner

JOHN J. McLAUGHLIN, Jr., Assistant Examiner

U.S. Cl. X.R.

60—54.5; 92—130; 188—151, 170; 303—2, 13, 68